Feb. 24, 1970  W. J. STAHLER  3,496,861
DEVICE FOR DISPOSING OF SPENT COFFEE GROUNDS
Filed Aug. 5, 1968  2 Sheets-Sheet 1
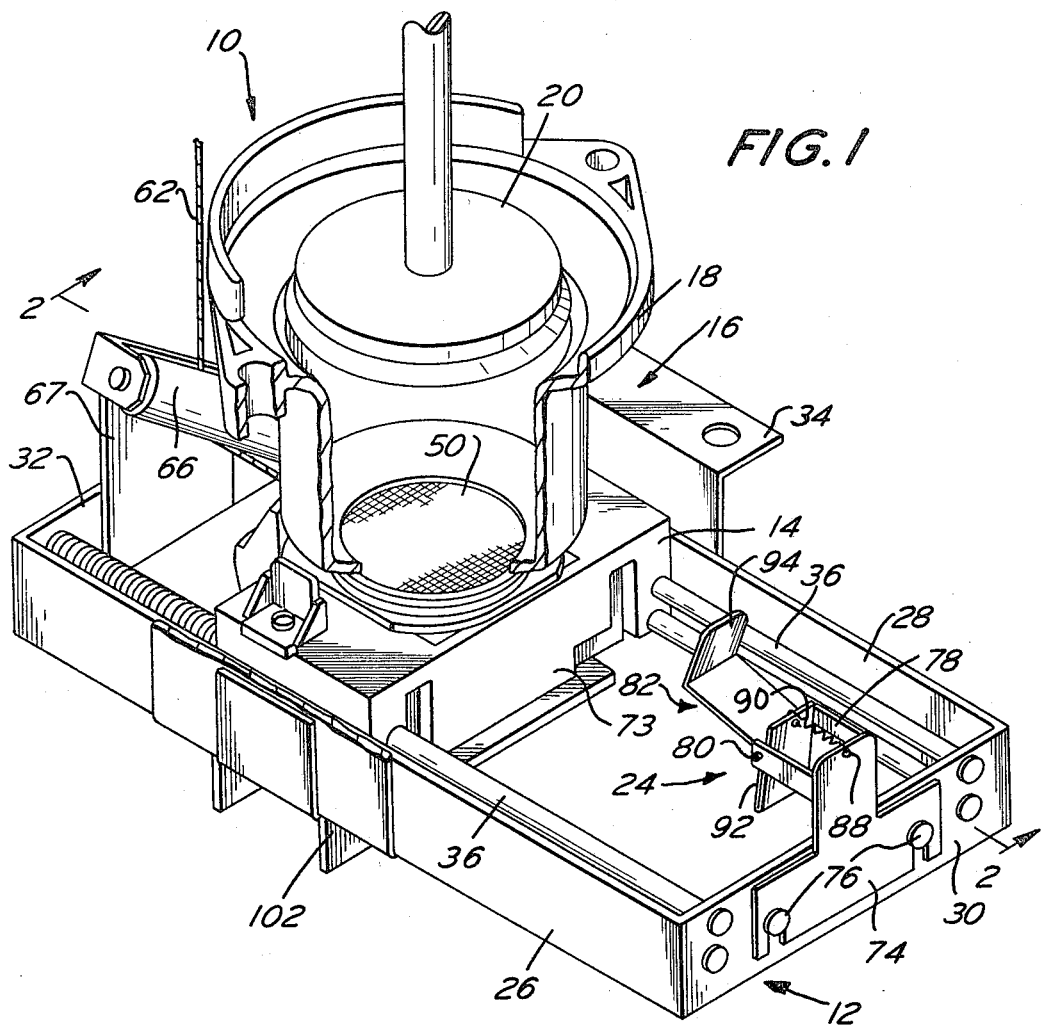
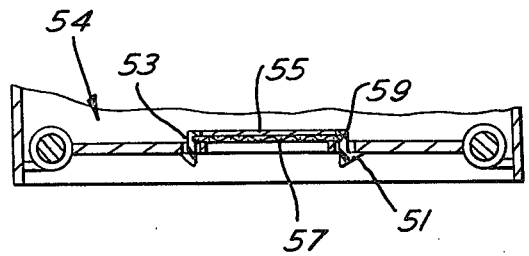
INVENTOR
WILLIAM J. STAHLER
BY
Seidel & Gonda
ATTORNEYS.

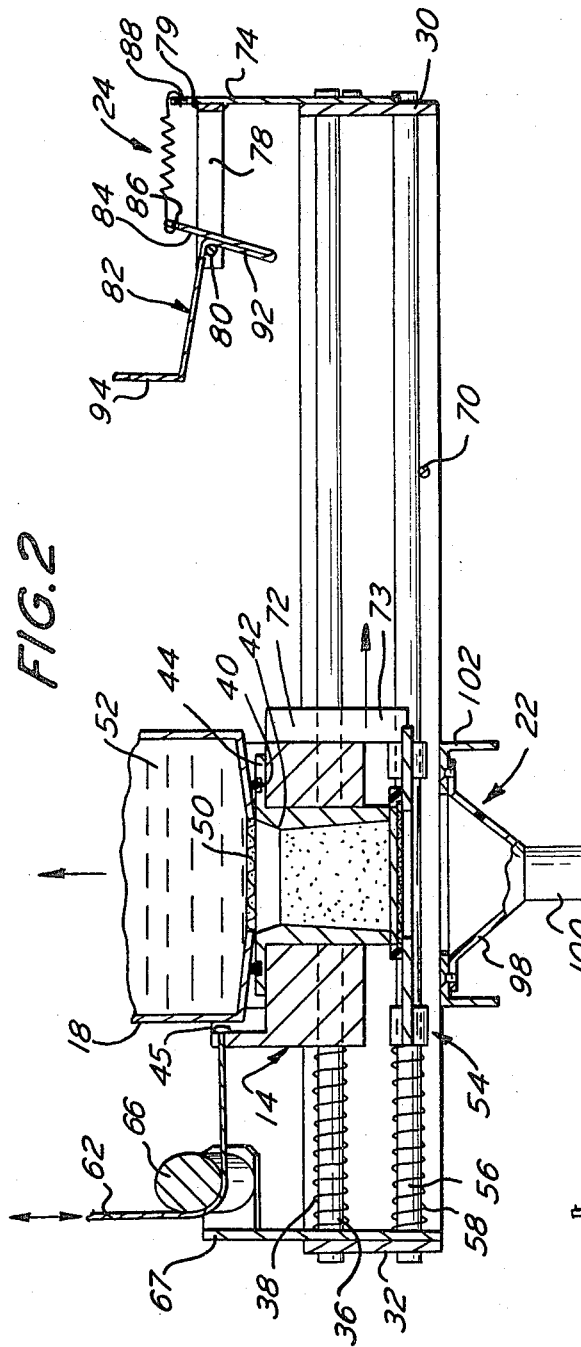
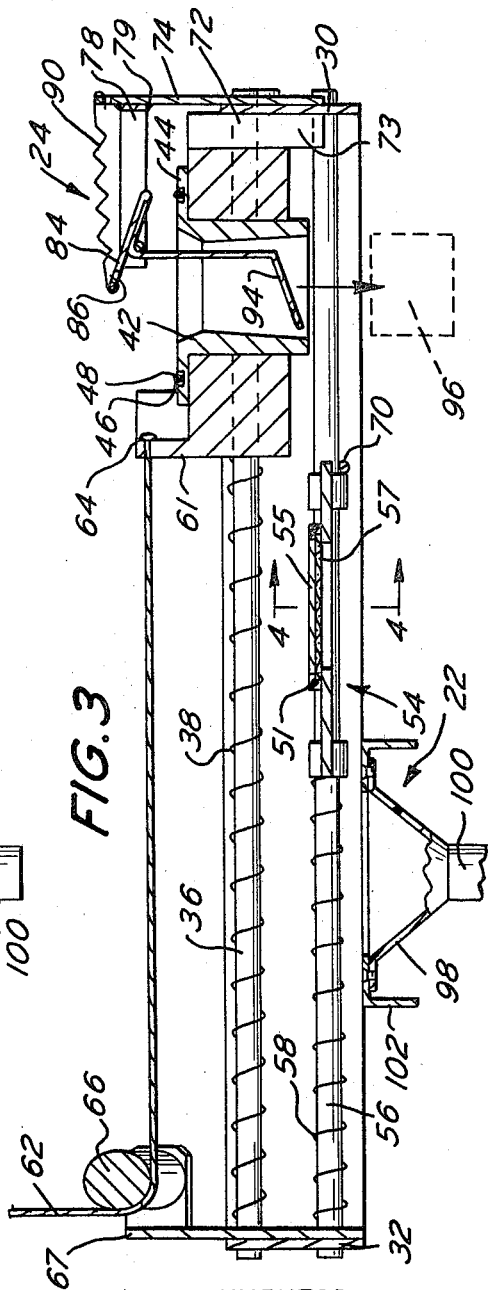

United States Patent Office 3,496,861
Patented Feb. 24, 1970

3,496,861
DEVICE FOR DISPOSING OF SPENT COFFEE GROUNDS
William J. Stahler, Warminster, Pa., assignor to Rudd-Melikian, Inc., Warminster, Pa., a corporation of Pennsylvania
Filed Aug. 5, 1968, Ser. No. 750,222
Int. Cl. A47j *31/00*
U.S. Cl. 99—289                    5 Claims

ABSTRACT OF THE DISCLOSURE

Apparatus is provided for disposing of spent ground or powdered material used in beverage brewing machines. The apparatus includes a generally S-shaped ejector member which is automatically activated by a carriage containing spent powdered beverage producing material to eject such spent material. The ground or powdered beverage producing material expands and forms a cake-like mass after a hot beverage has been passed therethrough. Accordingly, the entire cake of powdered material is ejected in one swift movement of the ejector member. The ejector member is automatically returned to its inoperative position upon movement of the carriage to the brewing station.

---

The present invention relates to a device for disposing of spent coffee grounds and, more particularly, to ejector apparatus which is utilized in beverage brewing apparatus for disposing of spent powdered or ground material within a brewing receptacle.

The ejector apparatus of the present invention is particularly adapted for use with beverage brewing apparatus such as the type disclosed in United States Patent 3,349,690 assigned to the same assignee as the instant application. The disclosure of the beverage brewing apparatus in said U.S. patent is specifically incorporated herein by reference. It has been found that after a hot beverage is forced through ground or powdered material, the hot beverage causes an expansion of such material and such material tends to form a single mass or cake. Hence, it has been heretofore proposed to dispose of the cake of material by severely jolting the receptacle. While the ground ejecting apparatus disclosed in Patent 3,349,690 has functioned adequately, the uncontrolled jolt which caused ejection of the grounds may become damaging to various parts after prolonged periods of use.

It is an object of the present invention to provide an ejector apparatus for ejecting grounds or powdered material from a receptacle in brewing apparatus.

It is another object of the present invention to provide an ejector apparatus wherein jolting of the various mechanisms is avoided.

It is a further object of the present invention to provide an ejector apparatus wherein an ejector member positively forces spent ground or powdered material from a receptacle in a brewing device.

It is yet another object of the present invention to provide an ejector apparatus which utilizes an ejector head which is automatically operated and which automatically returns to an inoperative position.

Other objects will appear hereinafter.

The above and other objects are accomplished by providing an ejector apparatus which includes a depending leg adapted to be in the path of a movable carriage. The movable carriage is provided with an abutment thereon. The movable carriage is also provided with a receptacle within which powdered or ground material is contained. Hot water is forced through the powdered or ground material at a brewing station. Thereafter, the receptacle having the spent grounds or powdered material therein is moved with the carriage to a retracted position. The abutment on the carriage will strike the depending leg on the ejector apparatus and cause the ejector head to pivot about a pivot shaft and enter the receptacle. The ejector head will force the entire mass or cake of ground material through the receptacle into a suitable waste receptacle.

For the purpose of illustrating the invention there is shown in the drawings a form which is presently preferred; it being understood, however, that this invention is not limited to the precise arrangements and instrumentalities shown.

FIGURE 1 is a perspective view, broken away in part, of the apparatus of the present invention;

FIGURE 2 is a section view taken along line 2—2 of FIGURE 1;

FIGURE 3 is a section view similar to FIGURE 2 showing the carriage in its retracted position; and FIGURE 4 is a section view taken along line 4—4 of FIGURE 3.

Referring now to the drawings in detail wherein like numerals indicate like elements throughout the several views, there is shown in FIGURES 1–4 beverage brewing apparatus indicated generally by the reference numeral 10. The apparatus includes a generally rectangular frame 12 having a movable carriage 14 supported thereon adapted to move between a brewing station 16 and a retracted position shown in FIGURE 3. At the brewing station 16 there is provided a cylindrically shaped brewing member 18 having a piston 20 adapted to reciprocate therein. A drain structure 22 is located beneath the movable carriage 14 and is adapted to deliver brewed beverage to a cup. A ground ejecting device 24 is provided on one end of the frame 12.

The frame 12 includes side walls 26 and 28 and end walls 30 and 32. A support 34 may be secured to side wall 20 to facilitate removably mounting the frame 12 in a dispensing machine.

A pair of rod-like rails 36 extend between the end walls 30 and 32 of the frame 12. A carriage 14 is supported by the rails 36 as clearly shown in FIGURES 1–3 of the drawing. A pair of springs 38 on the rails 36 urge the carriage 14 into the retracted position shown in FIGURE 3.

Referring to FIGURE 2, the carriage 14 is provided with a centrally disposed opening 40 therein. A sleeve-like insert or receptacle 42 is received within the opening 40. The insert 42 has a flange 44 thereon which engages the planar surface 45 of the carriage 14. Spring means, not shown, may be provided to retain the insert 42 in its desired orientation. Alternatively, the insert 42 could be tightly frictionally engaged in the opening 40. A groove 46 is provided in the flange 44. A sealing O-ring 48 is provided in the groove 46 to insure a water-tight seal between the receptacle 42 and the brewing member 18 during the brewing operation.

The brewing member 18 is adapted to have brewing liquid 52 therein. The brewing member 18 is provided with a mesh screen member 50 through which the brewing liquid is adapted to pass. The operation of the brewing aparatus is identical to that set forth in Patent 3,349,690 and, accordingly, need not be set forth herein in detail.

A sub-carriage 54 is slidably mounted on a second pair of rails 56 located parallel to and slightly below the rails 36. The sub-carriage 54 is urged by means of springs 58 into a position intermediate that of the retracted position of the carriage 14 and the brewing station 16.

The sub-carriage 54 is provided with an orifice 53. A porous filter member 55 is supported by a filter support 51 and covers the orifice 53. While various types of filter members could be provided, the use of a filter formed of a stainless steel plate electro-etched with extremely small holes having a diameter of about .005" is preferred. Such a filter presents an extremely smooth surface with holes so fine that there is practically no chance that they will be clogged by dirt, powder or grounds. A wiper (not shown) can be provided to wipe the filter clean. In preferred practice, the screen is etched in a circular pattern having an overall diameter about the same as that of the inside diameter of insert or receptacle 42. A support member such as a heavy wire mesh screen 57 may be placed in a groove 59 in the filter support 51 in order to prevent undue flexing of the filter member 55.

The carriage 14 is adapted to move from its retracted position shown in FIGURE 3 to the brewing station 16 by a drive means (not shown) in detail.

The drive means includes a cable 62 which is attached to one end of an abutment 61 of the carriage 14. A bead 64 secured to one end of the cable 62 fits into a groove on the abutment 61. The cable is guided around an idler roller 66 which is attached to a support plate 67 which is secured to end wall 32 of the frame 12.

Suitable means is provided for winding and unwinding the cable 62 to effect movement of the carriage 14. Such means could be identical to the pulley system disclosed in Patent 3,349,690. When the cable 62 is taken up, it will move the carriage 14 from the righthand position shown in FIGURE 3 to the brewing station beneath the cylinder 18 as shown in FIGURE 2.

An abutment plate 72 on the carriage 14 has a lowermost lip 73 extending downwardly into the path of movement of the sub-carriage 54. Upon movement of the carriage 14 toward the brewing station 16, the lip 73 will engage the sub-carriage 54 and move the same to the brewing station 16. At this time, the insert 42 will be in registry with the sub-carriage 54 and the insert and sub-carriage then form side and bottom wall portions of a cup-like receptacle capable of carrying a charge of fresh coffee or other material to be brewed to the brewing station 16.

A coffee hopper (not shown) may be located at the righthand side of the cylinder 18. The hopper will deliver a predetermined quantity of fresh ground coffee or the like material into the insert 42 after the insert 42 has been withdrawn so that it is positioned over the sub-carriage 54. The filter 55 will provide a base for the insert 42 as the ground material is dropped therein. A suitable stop 70 is provided to positively stop the sub-carriage 54 from moving with the carriage 14 to its fully retracted position. As the cable 62 is unwound, both the carriage 14 and the sub-carriage 54 will be urged to the right as viewed in FIGURES 2 and 3 by the springs 38 and 58, respectively. After the cable 62 has been unwound, the carriages will attain the positions shown in FIGURE 3.

The ground ejecting device 24 is mounted on a support bracket 74 which is secured to the end wall 30 of the frame 12 by screws or rivets 76. The bracket 74 has a U-shaped member 78 secured thereto in any convenient manner such as by weldment 79 or the like. The U-shaped member 78 is adapted to support a pivot shaft 80 which has its ends journaled in openings provided in the U-shaped member. Retaining rings may be provided on the pivot shaft 80 to prevent undesirable movement of the shaft.

The ground ejecting device 24 includes a generally S-shaped ejector 82. The S-shaped ejector 82 is provided with an upstanding lip 84 which has a hole 86 therein. The support bracket 74 has a hole 88 therein. A spring 90 has its ends engaged in the holes 86 and 88 and urges the ejecting device into the position shown in FIGURES 1 and 2. The spring 90 urges the ejecting device clockwise about the pivot shaft 80.

One leg 92 of the ejector 82 extends into path of movement of the carriage 14. As the carriage 14 moves into its retracted position, the abutment plate 72 will engage the leg 92 and cause the ejector 82 to pivot counterclockwise about the shaft 80. As the ejector 82 moves in a counterclockwise direction, the ejector head 94 will enter the insert 42 as shown in FIGURE 3. The grounds or powdered material will have formed a homogeneous mass or cake 96 since the hot brewing beverage will have already passed therethrough. The ejector head 94 will force the mass or cake 96 out of the insert 42 into a suitable waste receptacle. The interior walls of the insert 42 flare downwardly and outwardly and facilitate movement of the mass or grounds 96 therefrom.

It is within the scope of the invention to provide an auxiliary means such as a spray jet which can be operated each cycle or after a predetermined number of cycles to insure that any clinging grounds or powder is caused to drop into the waste receptacle. Such a spray jet would be operative when the carriage 14 is in its retracted position.

The drain structure 22 is also mounted on the frame 12, and is positioned directly beneath and in axial alignment with cylinder 18 slightly below sub-carriage 54. The drain is provided with an outlet spout 98 communicating with a conduit 100. Conduit 100 communicates with a dispensing station wherein brewed liquid is dispensed into a prepositioned cup. The spout 98 is secured to a support plate 102 suitably connected to the frame 12.

The present invention may be embodied in other specific forms without departing from the spirit or essential attributes thereof and, accordingly, reference should be made to the appended claims, rather than to the foregoing specification as indicating the scope of the invention.

It is claimed:

1. Apparatus comprising a frame having a beverage brewing station at one end thereof, a carriage movable between a retracted position and the beverage brewing station, a receptacle associated with said carriage for receiving ground powdered material adapted to have a hot beverage flow therethrough when said carriage is in said beverage brewing station, means for moving said carriage to said retracted position, an ejector means mounted on said frame adjacent the retracted position, an abutment on said carriage, said abutment contacting said ejector means as said carriage is moved to said retracted position thereby causing said ejector means to enter said receptacle and force the spent powdered material out of said receptacle.

2. Apparatus as set forth in claim 1 wherein said ejector means includes a U-shaped support, a pivot shaft journaled in said U-shaped support, a generally S-shaped ejector member, said S-shaped ejector member being adapted to move about said pivot shaft.

3. Apparatus as set forth in claim 2 including spring means urging said S-shaped ejector member into an inoperative position, a depending leg of said generally S-shaped ejector extending into the path of movement of said abutment on said carriage.

4. An ejector mechanism for ejecting a cake of spent ground material from a receptacle in a movable carriage including a generally S-shaped ejector member having an upstanding lip, said ejector member being supported by a generally rectangular frame, spring means interconnecting said upstanding lip and said frame adapted to urge said ejector member into an inoperative position, said ejector member including a depending leg adapted to be in the path of movement of the movable carriage whereby an abutment on the movable carriage will cause said generally S-shaped ejector to move against the urging of said spring means to thereby cause ejection of the cake of powdered material.

5. An ejector mechanism as set forth in claim 4 wherein said generally S-shaped ejector is adapted to move about a pivot shaft, said pivot shaft being supported by a generally U-shaped member attached to a bracket secured to the frame.

References Cited

UNITED STATES PATENTS

| | | | |
|---|---|---|---|
| 3,292,526 | 12/1966 | Heier | 99—289 |
| 3,349,690 | 10/1967 | Heier | 99—289 X |
| 3,369,478 | 2/1968 | Black | 99—289 |

ROBERT W. JENKINS, Primary Examiner